(12) United States Patent
Tu et al.

(10) Patent No.: US 6,381,463 B1
(45) Date of Patent: Apr. 30, 2002

(54) METHOD AND APPARATUS FOR PROVIDING INTELLIGENT CELLULAR HANDOFF

(75) Inventors: Jerome C. Tu, San Jose; Pi-Hui Chao, Foster City, both of CA (US)

(73) Assignee: Interwave Communications International, Ltd. (BM)

( * ) Notice: Subject to any disclaimer, the term of this patent is extended or adjusted under 35 U.S.C. 154(b) by 0 days.

(21) Appl. No.: 08/790,206

(22) Filed: Feb. 5, 1997

Related U.S. Application Data (63) Continuation-in-part of application No. 08/434,554, filed on May 4, 1995.

(51) Int. Cl.[7] .............................. H04Q 7/20; G01S 3/02
(52) U.S. Cl. ...................... 455/456; 455/422; 455/427; 455/503; 342/457
(58) Field of Search ................................ 455/436, 439, 455/440, 444, 456, 524, 525; 342/450, 457, 451, 452, 453, 454, 455, 456; 370/331; 340/991, 992, 993, 986; 375/150, 142, 325, 340, 341, 342, 343

(56) References Cited

U.S. PATENT DOCUMENTS

| | | | | |
|---|---|---|---|---|
| 5,045,861 A | * | 9/1991 | Duffett-Smith | 342/457 |
| 5,276,706 A | * | 1/1994 | Critchlow | 375/13 |
| 5,278,991 A | * | 1/1994 | Ramsdale et al. | 455/33.2 |
| 5,307,278 A | * | 4/1994 | Hermans et al. | 364/450 |
| 5,394,158 A | * | 2/1995 | Chia | 342/457 |
| 5,604,806 A | * | 2/1997 | Hassan et al. | 380/44 |
| 5,613,211 A | * | 3/1997 | Matsuno | 455/51.1 |
| 5,633,888 A | * | 5/1997 | Stewart | 375/202 |
| 5,655,217 A | * | 8/1997 | Lemson | 455/513 |
| 5,670,964 A | * | 9/1997 | Dent | 342/457 |
| 5,678,185 A | * | 10/1997 | Chia | 455/33.2 |
| 5,805,200 A | * | 9/1998 | Counselman, III | 342/357 |
| 6,009,334 A | * | 12/1999 | Grubeck et al. | 455/456 |
| 6,243,587 B1 | * | 6/2001 | Dent et al. | 455/456 |

FOREIGN PATENT DOCUMENTS

| | | |
|---|---|---|
| EP | 0526436 A1 | 2/1993 |
| WO | WO97/00587 | 1/1997 |

* cited by examiner

*Primary Examiner*—William Trost
*Assistant Examiner*—Sheila Smith
(74) *Attorney, Agent, or Firm*—Flehr Hohbach Test Albritton & Herbert LLP

(57) ABSTRACT

A cellular network includes a receiver configured to receive inbound information from a mobile station. A correlator is coupled to the receiver and configured to correlate the inbound information against expected information to generate a correlator signal. An interpolator is coupled to the correlator and configured to interpolate the correlator signal to generate an interpolator signal. A memory is coupled to the interpolator and configured to store the interpolator signal. A processor is coupled to the memory and configured to process the interpolator signal to determine a position of the mobile station. Additional embodiments track the position of the mobile station based on cellular hand off and mobile station position over time. The cellular network can transfer the mobile station from the microcellular network to the macrocellular network if the mobile station is moving rapidly. The cellular network can transfer the mobile station from the macrocellular network to the microcellular network if the mobile station is moving slowly. Advantages of the invention include the ability to reduce control traffic among the network elements including the BTS, BSC and MSC. As a result, the inventive network can handle more telephone calls and can organize the calls more efficiently than in traditional cellular networks.

38 Claims, 6 Drawing Sheets

METHOD AND APPARATUS FOR PROVIDING INTELLIGENT CELLULAR HANDOFF

REFERENCE TO RELATED APPLICATIONS

This is a continuation-in-part of the following application and incorporates the application by reference:

Spread Spectrum Communication Network Signal Processor, U.S. Ser. No. 08/434,554, filed May 4, 1995.

FIELD

The present invention relates to a method and apparatus for providing intelligent cellular handoff. In particular, the invention tracks a mobile station's position with respect to a first base station and decides whether to hand off the mobile station to a second base station.

BACKGROUND

Figure 1:
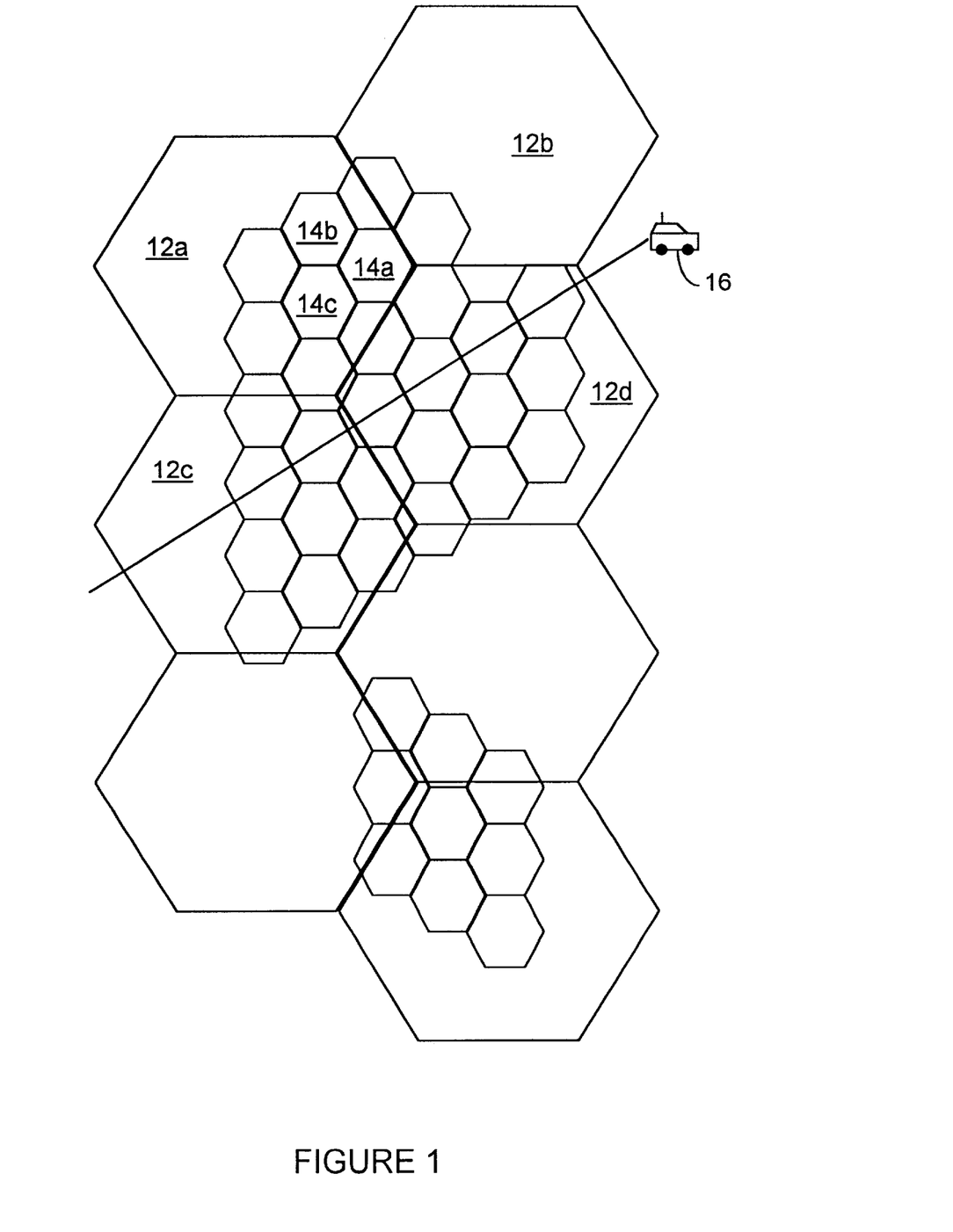
FIG. 1 depicts a geographical area having several macrocells and several microcells.

Wireless communication systems must provide service to many different geographical areas. Some of these areas are sparsely populated with wireless subscribers, such as suburban areas. Other areas are densely populated with wireless subscribers, such as urban areas. FIG. 1 shows these sparsely and densely populated areas and their associated cellular service topology. All areas are serviced with macrocells 12. The macrocells provide relatively high powered service to permit many subscribers to communicate with a public telephone network. Highly populated areas are additionally serviced with microcells 14. The microcells provide relatively low power service to permit large numbers of subscribers to communicate with the public telephone network.

Figure 2:
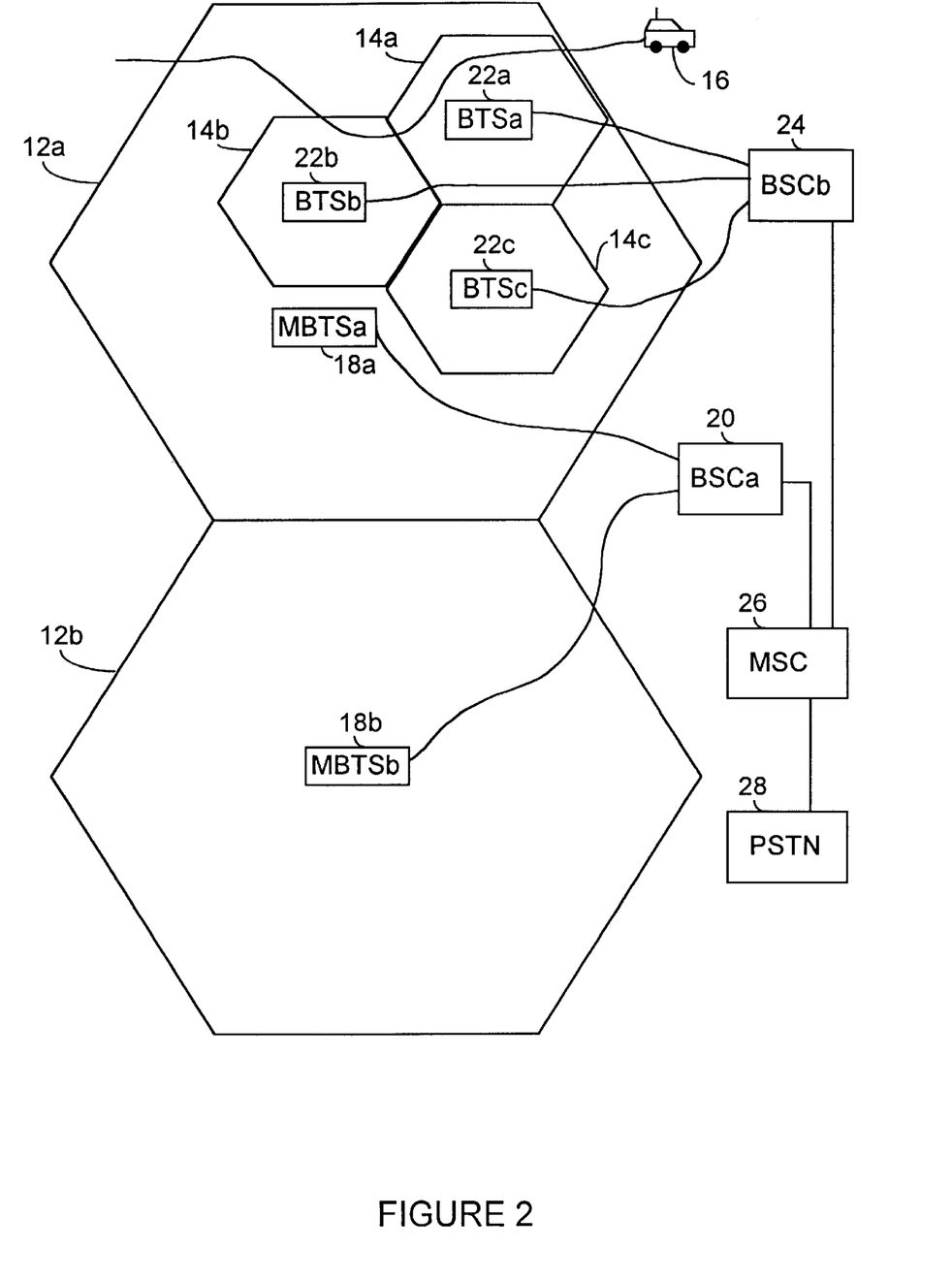
FIG. 2 depicts a hardware configuration for cellular equipment to service macrocells and microcells.

The macrocells and the microcells coexist quite well. FIG. 2 shows the hardware connections that constitute the macrocells 12 and the microcells 14. The macrocells include macrocell base transceiver stations (MBTS) 18a–b that provide the transmission and reception of wireless communication. MBTS 18a–b are coupled to base station controller (BSC) 20. The microcells include base transceiver stations (BTS) 22a–c that provide transmission and reception of wireless communication. The BTS are coupled to BSC 24. Both BSC 20 and 24 are coupled to mobile switching center (MSC) 26, which is coupled to public switched telephone network (PSTN) 28.

When a mobile station (MS) 16 moves among the cells, the BSC and MSC control which particular cell communicates with the MS and which particular cell the MS is handed to when the MS moves from cell to cell. Ordinarily, this is not a problem. When the MS moves from a first cell to a second cell, the MSC instructs the BSC and BTS to communicate with the MS from the second BTS. However, when a MS moves rapidy from cell to cell, a large amount of communication control traffic occurs between the BTS, BSC and MSC. This occurs often, for example, when the MS is in a car driving through an urban area on a freeway. As a result, control communication between the BTS, BSC and MSC becomes excessive, which decreases the number of calls that the cellular network can handle.

Accordingly, a limitation of existing cellular network communications is that excessive control communication occurs when a MS moves rapidly among microcells. Additionally, a limitation of existing cellular technology is that a position of the MS cannot be accurately determined in order for the MS to be tracked and a trend of the position determined.

SUMMARY

The invention relates to a method and apparatus for providing intelligent cellular handoff. In particular, the invention tracks a mobile station's position with respect to a first base station and decides whether to hand off the mobile station to a second base station.

An exemplary embodiment of a cellular network according to the invention includes a receiver configured to receive inbound information from a mobile station. A correlator is coupled to the receiver and configured to correlate the inbound information against expected information to generate a correlator signal. An interpolator is coupled to the correlator and configured to interpolate the correlator signal to generate an interpolator signal. A memory is coupled to the interpolator and configured to store the interpolator signal. A processor is coupled to the memory and configured to process the interpolator signal to determine a position of the mobile station.

Additional embodiments track the position of the mobile station based on cellular hand off and mobile station position over time. The cellular network can transfer the mobile station from the microcellular network to the macrocellular network if the mobile station is moving rapidly. The cellular network can transfer the mobile station from the macrocellular network to the microcellular network if the mobile station is moving slowly.

Advantages of the invention include the ability to reduce control traffic among the network elements including the BTS, BSC and MSC. As a result, the inventive network can handle more telephone calls and can organize the calls more efficiently than in traditional cellular networks.

DESCRIPTION OF THE FIGURES

Additional objects and features of the invention will be more readily apparent from the following detailed description and the pending claims when taken in conjunction with the drawings, in which:

DETAILED DESCRIPTION

The invention relates to a method and apparatus for providing intelligent cellular handoff. In particular, the invention tracks a mobile station's position with respect to a first base station and decides whether to hand off the mobile station to a second base station. Exemplary embodiments are provided for use with the Global Systems for Mobile Communication (GSM) communication protocol.

The exemplary embodiments are described herein with reference to specific configurations and protocols. Those skilled in the art will appreciate that various changes and modifications can be made to the exemplary embodiments while remaining within the scope of the invention.

As explained in the background, FIG. 1 depicts a geographical area having several macrocells 12a–d and several microcells 14a–c. A mobile station (MS) 16 travels through a number of cells during a call and must be continually serviced in order for the telephone equipment to maintain the call. FIG. 2 depicts a hardware configuration for cellular equipment to service macrocells and microcells. Note that BSCa 20 and BSCb 24 are both coupled to MSC 26. A mobile switching structure (MSS) makes the decision whether to handle the call through the macrocellular network 12a–d or the microcellular network 14a–c. In the exemplary embodiment the MSS is located in the MSC, but it could alternately be located in the BSC or BTS. To make the decision, the invention first locates the MS 16 and determines its position over time. The invention then determines how best to service the MS 16 using criteria including position and signal strength.

A. Mobile Station Position Determination

Figure 3:
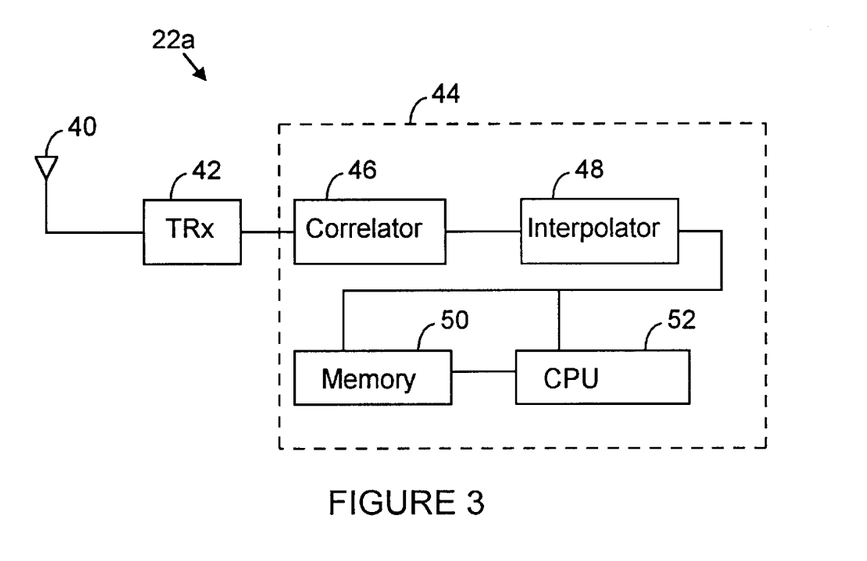
FIG. 3 depicts a hardware configuration for implementing the invention according an embodiment of the invention.
Figure 4:
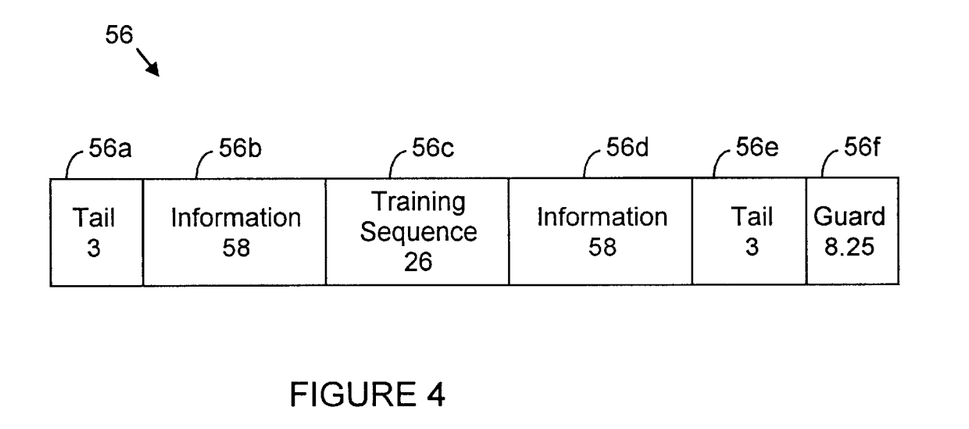
FIG. 4 depicts a burst according to the GSM format.
Figure 5:
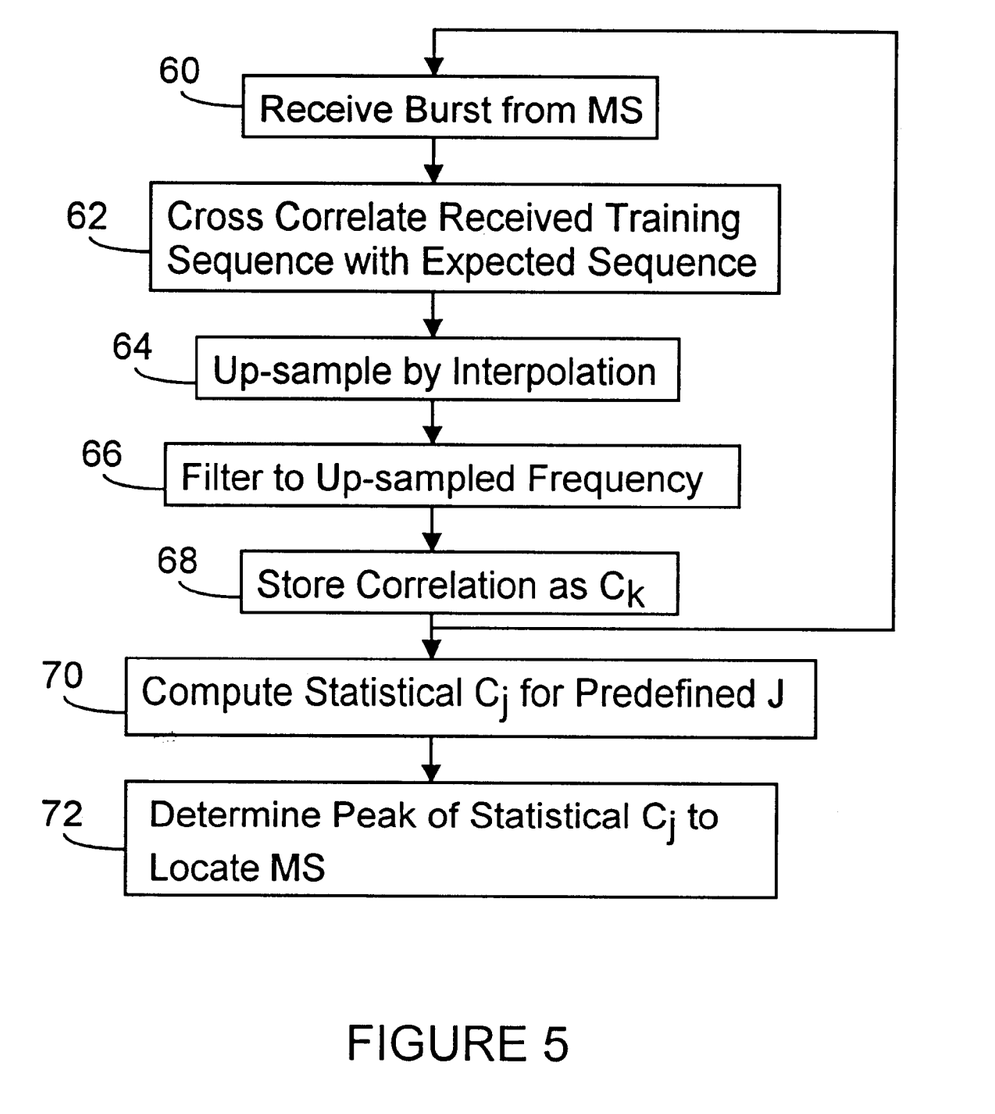
FIG. 5 is a flowchart for determining the position of a mobile station according to an embodiment of the invention.

An embodiment for determining a mobile station position is described with reference to FIGS. 3 through 5. FIG. 3 depicts a hardware configuration for implementing the invention according an embodiment of the invention. An antenna 40 and transceiver 42 are coupled to a processor 44, which performs the invention described below. Since the invention is described with reference to a GSM format, FIG. 4 depicts a burst 56 according to the GSM format. A burst includes a tail 56a, information 56b, training sequence (midamble) 56c, information 56d, tail 56e and guard 56f. The midamble 56c is the portion used to determine the position of MS 16. Under the GSM standard, the burst lasts 577 μs, which is 3.69 μs per bit. A typical receiver cross-correlates the received midamble 56c against eight possible sequences. The autocorrelation function is extraordinarily good for the correct signal. The receiver can determine a rough position of the mobile station by detecting the auto-correlation to the nearest bit, which results in a position resolution of 1.108 Km (3.69×10$^{-6}$ s×3.0×10$^{8}$ m/s=1108 m). Since the position resolution is based on round-trip signal travel the actual MS position resolution is half of 1.108 Km, or 554 m. For purposes of determining the MS position, this resolution is poor.

The invention provides significantly improved position resolution. Referring to FIG. 5, a flowchart is presented for determining the position of a mobile station according to an embodiment of the invention. In step 60, antenna 40 and transceiver 42 receive the burst from MS 16 as a received signal. In step 62, processor 44 receives the inbound midamble 56c as signal x(k) and cross correlates x(k) against an expected signal y(k) using a correlator 46. The result is a channel impulse response h(k) according to equation (1).

$$h(k)=\Sigma x(n)y^*(k-n) \tag{1}$$

In step 64, the correlation is up-sampled by inserting zeros between valid samples. This results in equation (2).

$$h_{up}(n*k)=h(k), \text{ for } n=0, 1, 2 \ldots h_{up}(k)=0 \text{ otherwise} \tag{2}$$

In step 66, an interpolation filter 48 is implemented to average the samples and to limit the bandwidth of the resulting digital signal to have a low-pass frequency. This results in equation (3).

$$h_{upf}(k)=\Sigma h_{up}(n)f(n-k) \tag{3}$$

In step 68, the correlation is stored and then steps 60 to 68 are repeated for q successive bursts to obtain q successive $h_{upf}(k)$ sequences. This results in equation (4).

$$h_{upf}(r,k), \text{ for } r=0,1,2 \ldots q-1 \tag{4}$$

In step 70, the q successive sequences are combined to obtain an average upsampled channel impulse response $h_{avg}(k)$. This results in equation (5).

$$h_{avg}(k)=\Sigma W(n)h_{upf}(n,k) \tag{5}$$

A variety of different statistical techniques can be employed in the invention to provide useful information. As explained in the previous paragraph, an average of the impulse response samples ($h_1, h_2, h_3, \ldots h_q$) can be used to determine the position of the MS. An unweighted average is one possibility according to equation (6).

$$(h_1+h_2+h_3+ \ldots h_q)/q \tag{6}$$

Another type of average is a weighted average according to equation (7), where coefficients $a_1$ to $a_q$ are based on the weight to give to each position sample.

$$(a_1h_1+a_2h_2+a_3h_3+ \ldots a_qh_q)/q \tag{7}$$

Yet another type of average is a modified median average according to equation (8) where the two extreme positions are discarded (e.q. $h_{q-1}$ and $h_q$).

$$(h_1+h_2+h_3+ \ldots h_{q-2})/(q-2) \tag{8}$$

These statistical techniques are used to provide an improved position determination of the MS. Additional statistical techniques are known in the art and can be employed in the invention to provide useful information. The result is a peak that identifies the position of the MS.

In step 72, the peak of $h_{avg}(k)$ is determined, resulting in an accurate position of the MS averaged over q bursts. The accuracy of the interpolated result is much better than that without the interpolated results. For example, with a relatively low number of interpolated and averaged results (e.g. 10) the peak can be determined to within approximately 1/10 of a bit time, which results in a position resolution of 111 meters. If a large number of interpolated and averaged results (e.g. 100) are computed, the peak can be determined within approximately 1/100 of a bit time, which results in a position resolution of 11 meters. If even larger numbers of interpolated and averaged results are computed, the peak can be determined within even better resolution.

While the MS position can be accurately determined, there are some competing principles in the environment. On the one hand, low number of averages will yield a quick rough MS position, on the other hand a large number of averages will yield a slow fine MS position. However, the MS may be fast moving and a large number of averages would be averaging the MS position at it moves. This would not yield a useful result. Therefore, the invention anticipates that a balance is sought between the time spent to determined the MS position and the resolution of the MS position. For example, in a GSM environment, a position resolution of 111 m is acceptable, which takes approximately 46 ms to achieve (10 frames×4.62 ms per frame). Also note that a position resolution of 11 m takes approximately 0.46 s (100 frames×4.62 ms per frame), but a car moving at 100 km/hr will travel only 12.8 m in this time period making this position resolution more accurate than required. As a result, it is anticipated that the balance between position resolution determination and averaging time will end up somewhere between the two examples given.

The BS keeps track of the MS position information over time (e.g. velocity) and provides the information to other portions of the cellular network. One example of use for the MS position and velocity information is described below under the heading Mobile Station Handoff Determination. Other examples of use for the MS position and velocity information includes emergency location of the MS and law enforcement purposes.

B. Channel Condition Measurements

An important aspect of cellular networks is to provide continuous call service. That is, calls should not be dropped due to signal degradation, but should rather be handed off to other cells that can handle the call. A difficulty with this aspect is that some areas are difficult to service due to various obstructions that cause fast signal loss and multipath effects. In order to accommodate trouble areas, for example, received signal strength information (RSSI) is collected by both the MS and the BTS so that the best BTS can service the MS. The GSM format provides that the MS and BTS are to perform channel condition measurements (e.g. signal strength and quality) once per superframe (480 ms). The channel condition measurements are often called uplink measurements. However, this is not often enough to accommodate handoff if the signal degrades quickly. Conventional techniques must compile several seconds worth of measurement reports to establish a trend or rate of change.

Therefore, an embodiment of the invention performs channel condition measurements by the BTS more often than specified in the GSM format. While the MS is limited to providing RSSI information, for example, once per superframe (due to the GSM specification), the BTS is not similarly limited. The BTS can perform channel condition measurements more frequently than required under the GSM specification.

In an embodiment of the invention, the BTS performs channel condition measurements every 8–10 ms instead of every 480 ms. In order to perform this procedure, the BTS processor is configured to perform the channel condition measurements more often. For example, the BTS collects channel conditions for each burst that may include received level RxLEV (also known as received signal strength—RSSI), received quality RxQUAL, bit error rate, timing advance TA and other conditions. A significant advantage of this additional information is that the MS signal trend is identified with greater temporal accuracy. In this manner, trends of the MS channel conditions are stored by the BTS and are used to determine whether to handoff the MS to another BTS.

The information is also used in trend analysis such as analysis represented in equations (9) and (10).

$$T_1 = f_1(RxLEV)(1), RxLEV(2), \ldots RxLEV(p)) \quad (9)$$

$$T_2 = f_2(RxQUAL(1), RxQUAL(2), \ldots RxQUAL(p) \quad (10)$$

The trend information is used to determine absolute RSSI information as well as rates of change in the channel condition information. The processor may employ filters to remove noise. A low pass filter, for example, permits the processor to identify and remove time fluctuating channel condition information due to multipath effects. Additionally, the processor may determine the first derivative of the trend information with respect to time or higher order derivatives of the trend information to identify relevant information. This information helps to predict whether the MS will experience a sudden loss of communication. For example, a large negative value of the first order derivative indicates a fast loss of signal strength, while a low value indicates that the MS is experiencing substantially constant signal strength, and a large positive value indicates that the MS is experiencing a fast gain of signal strength. As a result, the processor can accurately and quickly detect fading and signal degradation in order to handoff the MS to another BTS to promote continuous high quality communication.

C. Mobile Station Handoff Determination

Once the MS position is determined and the RSSI information is collected, the BTS must decide what to do with the MS. An embodiment for intelligently determining whether to handoff the MS to another BTS is described with reference to FIGS. 6 through 8.

Figure 6:
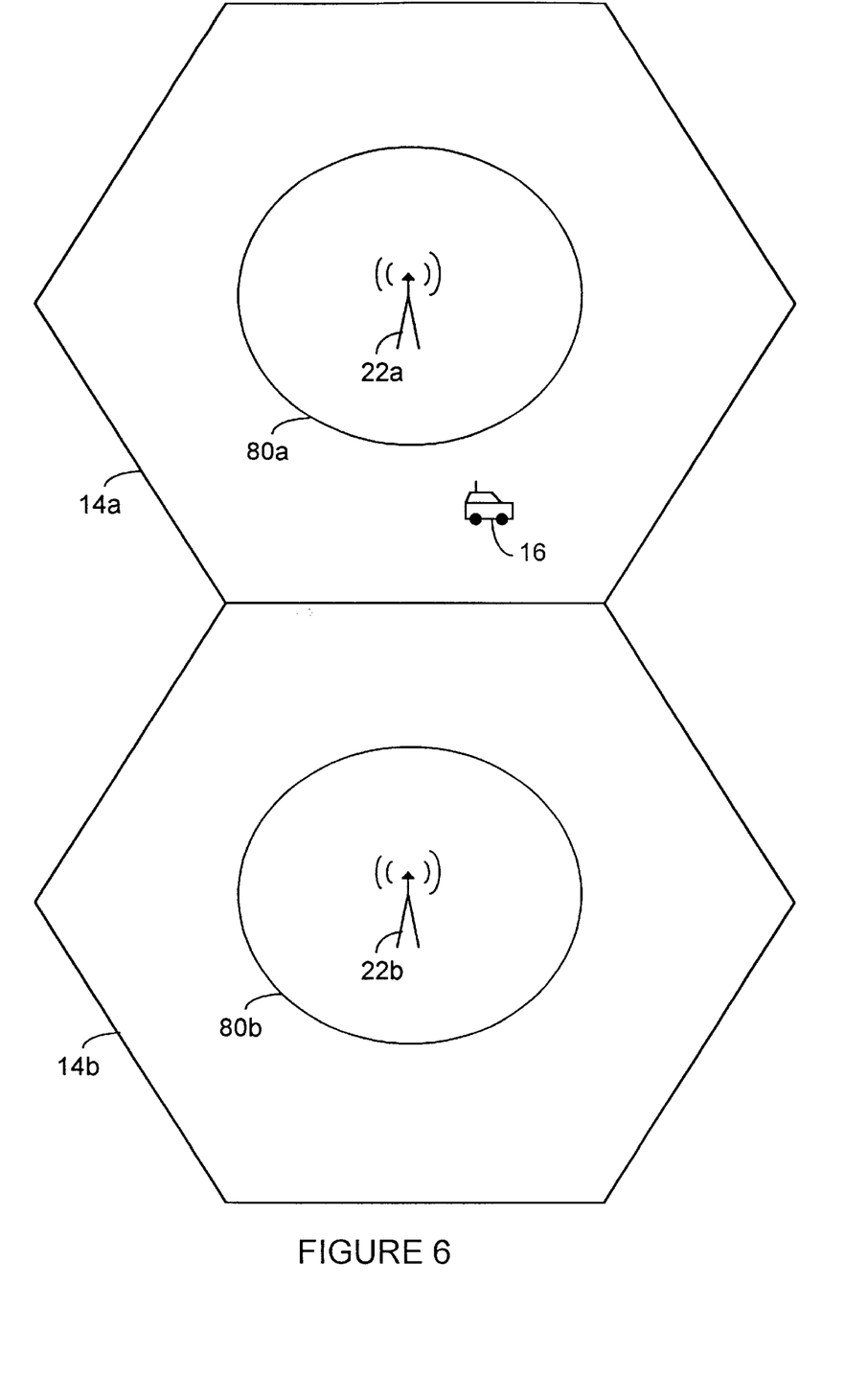
FIG. 6 depicts a microcellular network.

FIG. 6 depicts a cellular network. Two cells 14a and 14b are shown with respective BTS 22a and 22b. The cell boundaries are drawn to reflect a line where the transmitted power level from the respective BTS is, for example, −85 dBm. Within this boundary, a MS can receive an acceptable communication signal from the BTS. Also within cells 14a and 14b are strong power zones 80a and 80b where the transmitted power level from the respective BTS is, for example, −80 dBm. Within these zones, a MS will receive a continuous high quality signal.

Three handoff criteria are used in conventional cellular technology:

1) the threshold level of the current cell (14a);
2) the threshold level of the neighbor cell (14b); and
3) the threshold level of the neighbor power zone (80b).

Conventional cellular technology emphasizes the second and third criteria. That is, a significant factor in deciding whether to handoff a call is based on the neighbor cell 14b and the neighbor power zone 80b. While this emphasis works well in a macrocellular environment such as the suburbs, it does not work well in a microcellular environment such as the city. In a city, for example, the MS is continuously receiving signals from BTSs that come into view for only a short period of time and then disappear. This occurs often when a MS travels through an intersection between two tall buildings where a neighbor BTS is located down a perpendicular street. The MS may already have a good signal from the existing BTS, but since the handoff criteria emphasizes the neighbor cell power level, a handoff is performed. Then, after the MS travels through the intersection and the strong signal fades quickly, the MS is handed back to the first BTS. This results in a large number of handoffs and a large amount of network communication to perform the handoffs and maintain the call. The invention is designed to reduce both the number of handoffs and the resulting network communication.

The invention capitalizes on a variety of information to perform intelligent handoffs of the MS. The invention employs the conventional criteria, and additional criteria including:

4) the MS position and trend (e.g. velocity);
5) the channel condition information and trend; and
6) the known network topology of macrocells and microcells.

The invention places a significant amount of emphasis on the first criteria (the threshold level of the current cell (14a)) rather than on the second and third criteria as in the conventional technique. The invention reduces handoffs by permitting an MS that has good communication parameters to stay in communication with the BTS with which the MS is communicating. That is, the MS will not be handed off to a second BTS simply because the second BTS signal is stronger. The original communication must degrade below a predetermined threshold in order for the MS to be handed off. One reason for this change in emphasis is that in a microcellular environment there are a number of cells that can satisfy the MS communication requirements. Therefore, there is little need to quickly handoff a MS in order to prevent dropping the call unless the signal is degrading rapidly.

The invention can also employ the additional fourth, fifth and sixth criteria to determine whether to handoff a call. Since the invention is aware of the MS position, the MS velocity, the channel condition information and the network topology, the invention can intelligently determine whether to handoff the MS from a first BTS to a second BTS. Moreover, the invention can determine whether to handoff the MS from the macrocellular network to the microcellular network and vice versa. As a result, the invention reduces the number of handoffs and reduces network communication traffic in order to provide continuous high quality communication with the MS.

Figure 7:
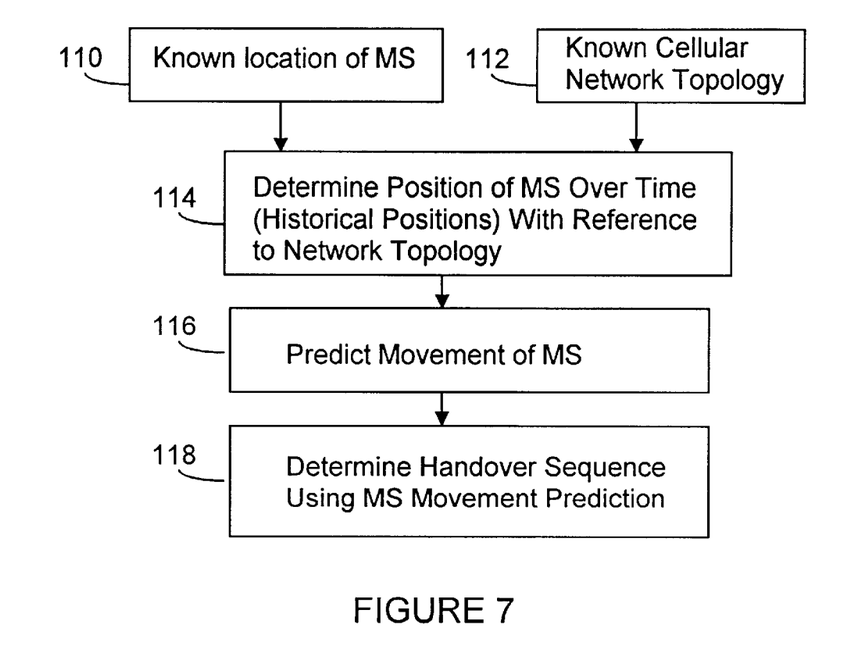
FIG. 7 is a flowchart for determining a handover sequence according to an embodiment of the invention.

An explanation of the operation is provided with reference to FIG. 1 and FIG. 7. In step 110, the processor determines the position of the MS 16 as described above. In step 112, the processor accesses the known topology of the cellular network that includes both the macrocells 12a–c and the microcells 14a–c. In step 114, the processor determines the position of the MS over time (velocity) with reference to the network topology. In step 116, the processor employs the MS position and position trend information to predict the future movement of the MS. If, for example, the historical movement of the MS is fast and along a known route such as a freeway, the processor will predict the future movement of the MS to continue along the freeway. However, if the MS velocity rapidly decreases, the processor will predict that the MS exited the freeway into urban traffic, a parking lot or other slow moving area. As such, position and position trend information includes derivatives of position with respect to time such as velocity and acceleration. In step 118, the processor will determine a handoff sequence for the MS that is consistent with the predicted movement of the MS. Steps 110 though 118 are performed periodically to update the position information, movement and predicted handoff sequence for the MS. If, for example, the MS takes an exit off the freeway, the processor will track the new position of the MS and will modify the handoff sequence accordingly to service the MS.

The invention is also capable of determining whether to handoff the call from a microcellular network to a macrocellular network and vice versa. Referring to the FIG. 8 flowchart, at step 130, the invention determines whether the MS is being serviced by the microcells. If yes, step 132 is performed to determine whether the MS has been handed off more than a predetermined number of times m (e.g. 3) in less than a predetermined number of seconds p (e.g. 90). If not, step 134 decides to keep the MS in the microcells.

Figure 8:
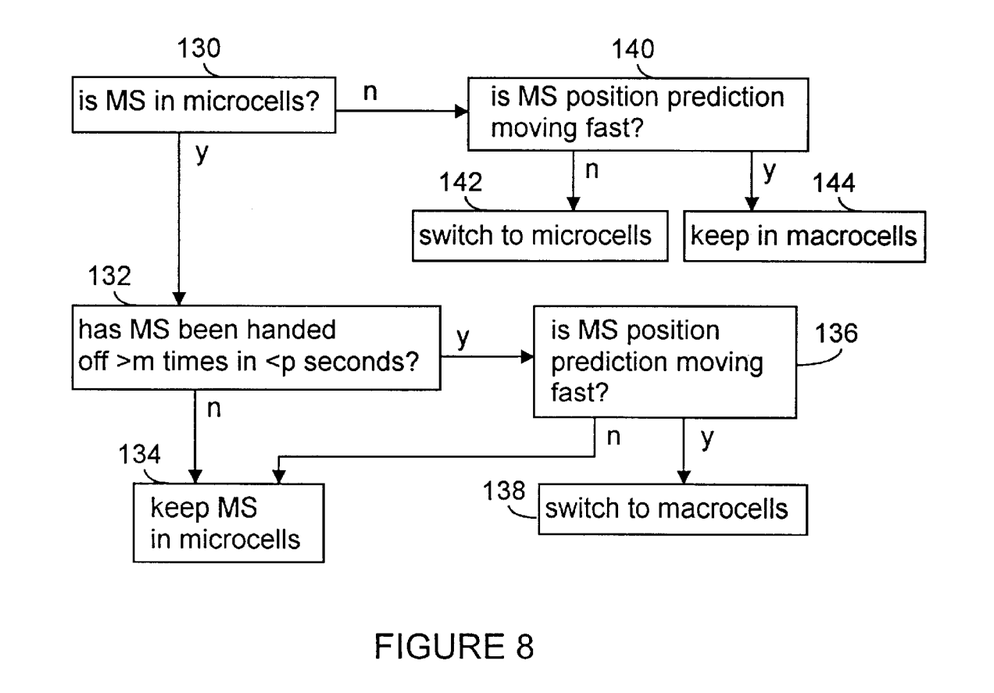
FIG. 8 is a flowchart for performing one of the functions of the FIG. 7 flowchart.

If step 132 is yes, step 136 employs additional information to determine whether the MS is predicted as a fast moving MS. If yes, step 138 switches the MS over to the macrocellular network. This serves to reduce the overall traffic because a fast moving MS would otherwise cause a large amount of handoff traffic in the microcellular network. If step 136 is no, step 134 decides to keep the MS in the microcells.

If step 130 determines that the MS is being serviced by the macrocells, step 140 determines whether the MS is predicted as a fast moving MS. If no, step 142 switches the MS over to the microcellular network. If yes, step 144 keeps the MS with the macrocellular network. This serves to reduce the overall traffic because a fast moving MS would otherwise cause a large amount of handoff traffic in the microcellular network.

The steps 132, 136 and 140 can be further augmented with additional criteria as explained above. For example, the determination of the numbers m and p can be modified with good results. The determination of whether the MS is fast moving can also consider information regarding RSSI and other relevant information.

CONCLUSION

Advantages of the invention include the ability to reduce control traffic among the network elements including the BTS, BSC and MSC. As a result, the inventive network can handle more telephone calls and can organize the calls more efficiently than in traditional cellular networks.

Having disclosed exemplary embodiments and the best mode, modifications and variations may be made to the exemplary embodiments while remaining within the scope of the invention as defined by the following claims.

What is claimed is:

1. A cellular base station for communicating with a mobile station and for determining a position of said mobile station, comprising:

a receiver configured to receive inbound information from said mobile station;

a correlator coupled to said receiver and configured to correlate said inbound information against expected information to generate a correlator signal;

an interpolator coupled to said correlator and configured to interpolate said correlator signal to generate an interpolator signal;

a memory coupled to said interpolator and configured to store said interpolator signal; and a processor coupled to said memory and configured to process said interpolator signal to determine a position of said mobile station.

2. The base station of claim 1, wherein:

said inbound information includes a plurality of bursts;

said correlator signal includes a correlator signal corresponding to each of said bursts;

said interpolator signal includes an interpolator signal corresponding to each of said correlator signals;

said memory is configured to store said interpolator signals; and said processor is configured to process said interpolator signals to determine said position of said mobile station.

3. The base station of claim 2, wherein:

said interpolator is configured to low-pass-filter said interpolator signals; and said processor is configured to process said interpolator signals by a statistical technique to determine said position of said mobile station.

4. The base station of claim 2, wherein:

said interpolator is configured to low-pass-filter said interpolator signals; and said processor is configured to process said interpolator signals by an averaging technique to determine said position of said mobile station.

5. A cellular network for providing intelligent cellular handoff of a mobile station, comprising:

a plurality of base stations, each base station including:
   (a) a receiver configured to receive inbound information from said mobile station;
   (b) a correlator coupled to said receiver and configured to correlate said inbound information against expected information to generate a correlator signal;
   (c) an interpolator coupled to said correlator and configured to interpolate said correlator signal to generate an interpolator signal;

(d) a memory coupled to said interpolator and configured to store said interpolator signal; and (e) a processor coupled to said memory and configured to process said interpolator signal to determine a position of said mobile station; and a mobile switching structure coupled to said base stations and configured to store said position of said mobile station over time and to determine whether to handoff said mobile station from a first base station to a second base station.

6. The cellular network of claim 5, wherein for each base station:

said inbound information includes a plurality of bursts;

said correlator signal includes a correlator signal corresponding to each of said bursts;

said interpolator signal includes an interpolator signal corresponding to each of said correlator signals;

said memory is configured to store said interpolator signals; and said processor is configured to process said interpolator signals to determine said position of said mobile station.

7. The cellular network of claim 6, wherein for each base station:

said interpolator is configured to low-pass-filter said interpolator signals; and said processor is configured to process said interpolator signals by a statistical technique to determine said position of said mobile station.

8. The cellular network of claim 6, wherein for each base station:

said interpolator is configured to low-pass-filter said interpolator signals; and said processor is configured to process said interpolator signals by an averaging technique to determine said position of said mobile station.

9. The cellular network of claim 5, wherein:

said mobile switching structure is configured to determine whether to handoff said mobile station from a first base station to a second base station based at least in part on a mobile station position trend.

10. The cellular network of claim 5, wherein:

said base stations are configured to measure channel condition information regarding said inbound information more often than said mobile station; and said mobile switching structure is configured to determine whether to handoff said mobile station from a first base station to a second base station based at least in part on said channel condition information.

11. The cellular network of claim 5, wherein:

said base stations are configured to measure channel condition information regarding said inbound information more often than said mobile station; and said mobile switching structure is configured to determine whether to handoff said mobile station from a first base station to a second base station based at least in part on a mobile station position trend and said channel condition information.

12. A cellular network for providing intelligent cellular handoff of a mobile station, comprising:

a plurality of macrocell base stations;

a plurality of microcell base stations, each microcell base station including:

(a) a receiver configured to receive inbound information from said mobile station;

(b) a correlator coupled to said receiver and configured to correlate said inbound information against expected information to generate a correlator signal;

(c) an interpolator coupled to said correlator and configured to interpolate said correlator signal to generate an interpolator signal;

(d) a memory coupled to said interpolator and configured to store said interpolator signal; and (e) a processor coupled to said memory and configured to process said interpolator signal to determine a position of said mobile station; and a mobile switching structure coupled to said macrocell base stations and to said microcell base stations and configured to store said position of said mobile station over time and to determine whether to handoff said mobile station from one of a macrocell base station to a microcell base station and a microcell base station to a macrocell base station.

13. The cellular network of claim 12, wherein for each base station:

said inbound information includes a plurality of bursts;

said correlator signal includes a correlator signal corresponding to each of said bursts;

said interpolator signal includes an interpolator signal corresponding to each of said correlator signals;

said memory is configured to store said interpolator signals; and said processor is configured to process said interpolator signals to determine said position of said mobile station.

14. The cellular network of claim 13, wherein for each base station:

said interpolator is configured to low-pass-filter said interpolator signals; and said processor is configured to process said interpolator signals by a statistical technique to determine said position of said mobile station.

15. The cellular network of claim 13, wherein:

said mobile switching structure is configured to determine whether to handoff said mobile station from one of a macrocell base station to a microcell base station and a microcell base station to a macrocell base station based at least in part on a mobile station position trend.

16. A cellular network for providing intelligent cellular handoff of a mobile station, comprising:

a plurality of macrocell base stations;

a plurality of microcell base stations configured to receive inbound information from said mobile station; and a mobile switching structure coupled to said macrocell base stations and to said microcell base stations and configured to store information associated with the relationship between said mobile station with a specific microcell base station over time and to determine whether to handoff said mobile station from one of a macrocell base station to a microcell base station and a microcell base station to a macrocell base station.

17. The cellular network of claim 16, wherein:

said mobile switching structure is configured to determine whether to handoff said mobile station from one of a macrocell base station to a microcell base station and a microcell base station to a macrocell base station based at least in part on a mobile station position trend.

18. The cellular network of claim 16, wherein:

said base stations are configured to measure channel condition information regarding said inbound information more often than said mobile station; and said mobile switching structure is configured to determine whether to handoff said mobile station from one of a macrocell base station to a microcell base station and a microcell base station to a macrocell base station based at least in part on said channel condition information.

19. The cellular network of claim 16, wherein:

said base stations are configured to measure channel condition information regarding said inbound information more often than said mobile station; and said mobile switching structure is configured to determine whether to handoff said mobile station from one of a macrocell base station to a microcell base station and a microcell base station to a macrocell base station based at least in part on a mobile station position trend and said channel condition information.

20. A method of communicating between a base station and a mobile station and for determining a position of said mobile station, comprising the steps of:

receiving inbound information from said mobile station;

correlating said inbound information against expected information to generate a correlator signal;

interpolating said correlator signal to generate an interpolator signal;

storing said interpolator signal; and processing said interpolator signal to determine a position of said mobile station.

21. The method of claim 20, wherein:

said inbound information includes a plurality of bursts;

said correlating step is performed by correlating each of said bursts to generate a plurality of correlator signals;

said interpolating step is performed by interpolating each of said correlator signals to generate a plurality of interpolator signals;

said storing step is performed by storing said interpolator signals; and said processing step is performed by processing said interpolator signals to determine said position of said mobile station.

22. The method of claim 21, wherein:

said interpolating step includes the step of low-pass-filtering said interpolator signals; and said processing step includes the step of processing said interpolator signals by a statistical technique to determine said position of said mobile station.

23. The method of claim 21, wherein:

said interpolating step includes the step of low-pass-filtering said interpolator signals; and said processing step includes the step of processing said interpolator signals by an averaging technique to determine said position of said mobile station.

24. A method in a cellular network having a plurality of base stations and a mobile switching structure coupled to said base stations for providing intelligent cellular handoff of a mobile station among said base stations, comprising the steps of:

for each base station, performing the steps including:
(a) receiving inbound information from said mobile station;
(b) correlating said inbound information against expected information to generate a correlator signal;
(c) interpolating said correlator signal to generate an interpolator signal;
storing said interpolator signal; and
(d) processing said interpolator signal to determine a position of said mobile station; and for said mobile switching structure, performing the steps including:
(a) storing said position of said mobile station over time; and
(b) determining whether to handoff said mobile station from a first base station to a second base station.

25. The method of claim 24, wherein for each base station:

said inbound information includes a plurality of bursts;

said correlating step is performed by correlating each of said bursts to generate a plurality of correlator signals;

said interpolating step is performed by interpolating each of said correlator signals to generate a plurality of interpolator signals;

said storing step is performed by storing said interpolator signals; and said processing step is performed by processing said interpolator signals to determine said position of said mobile station.

26. The method of claim 25, wherein for each base station:

said interpolating step includes the step of low-pass-filtering said interpolator signals; and said processing step includes the step of processing said interpolator signals by a statistical technique to determine said position of said mobile station.

27. The method of claim 25, wherein for each base station:

said interpolating step includes the step of low-pass-filtering said interpolator signals; and said processing step includes the step of processing said interpolator signals by an averaging technique to determine said position of said mobile station.

28. The method of claim 24, wherein for said mobile switching structure:

said determining step is performed based at least in part on a mobile station position trend.

29. The method of claim 24, wherein:

for said base station, said receiving step includes the step of measuring channel condition information regarding said inbound information more often than said mobile station; and for said mobile switching structure, said determining step is performed base: at least in part on said channel condition information.

30. The method of claim 24, wherein:

for said base station, said receiving step includes the step of measuring channel condition information regarding said inbound information more often than said mobile station; and for said mobile switching structure, said determining step is performed based at least in part on a mobile station position trend and said channel condition information.

31. A method in a cellular network having a plurality of macrocell base stations, a plurality of microcell base stations and a mobile switching structure coupled to said macrocell base stations and said microcell base stations for providing intelligent cellular handoff of a mobile station among said macrocell base stations and said microcell base stations, comprising the steps of:

for each microcell base station, performing the steps including:
(a) receiving inbound information from said mobile station;

(b) correlating said inbound information against expected information to generate a correlator signal;

(c) interpolating said correlator signal to generate an interpolator signal;

storing said interpolator signal; and (d) processing said interpolator signal to determine a position of said mobile station; and for said mobile switching structure, performing the steps including:

(a) storing said position of said mobile station over time; and (b) determining whether to handoff said mobile station from one of a macrocell base station to a microcell base station and a microcell base station to a macrocell base station.

32. The method of claim 31, wherein for each microcell base station:

said inbound information includes a plurality of bursts;

said correlating step is performed by correlating each of said bursts to generate a plurality of correlator signals;

said interpolating step is performed by interpolating each of said correlator signals to generate a plurality of interpolator signals;

said storing step is performed by storing said interpolator signals; and said processing step is performed by processing said interpolator signals to determine said position of said mobile station.

33. The method of claim 32, wherein for each base station:

said interpolating step includes the step of low-pass-filtering said interpolator signals; and said processing step includes the step of processing said interpolator signals by a statistical technique to determine said position of said mobile station.

34. The method of claim 32, wherein for said mobile switching structure:

said determining step is performed based at least in part on a mobile station position trend.

35. A method in a cellular network having a plurality of macrocell base stations, a plurality of microcell base stations and a mobile switching structure coupled to said macrocell base stations and said microcell base stations for providing intelligent cellular handoff of a mobile station among said macrocell base stations and said microcell base stations, comprising the steps of:

for each microcell base station, performing the steps including:

(a) receiving inbound information from said mobile station; and for said mobile switching structure, performing the steps including:

(a) storing information associated with the relationship between said mobile station with a specific microcell base station over time; and (b) determining whether to handoff said mobile station from one of a macrocell base station to a microcell base station and a microcell base station to a macrocell base station.

36. The method of claim 35, wherein for said mobile switching structure:

said determining step is performed based at least in part on a mobile station position trend.

37. The method of claim 35, wherein:

for said base station, said receiving step includes the step of measuring channel condition information regarding said inbound information more often than said mobile station; and for said mobile switching structure, said determining step is performed based at least in part on said channel condition information.

38. The method of claim 35, wherein:

for said base station, said receiving step includes the step of measuring channel condition information regarding said inbound information more often than said mobile station; and for said mobile switching structure, said determining step is performed based at least in part on a mobile station position trend and said channel condition information.

* * * * *